Nov. 12, 1957 R. D. BIBBY 2,812,787
FLYING SAW CUTTING APPARATUS FOR WORK
MOVING AT VARIABLE SPEED
Filed March 2, 1955 6 Sheets-Sheet 2

INVENTOR
RALPH DOLMAN BIBBY
BY
Cushman, Darby & Cushman
ATTORNEYS

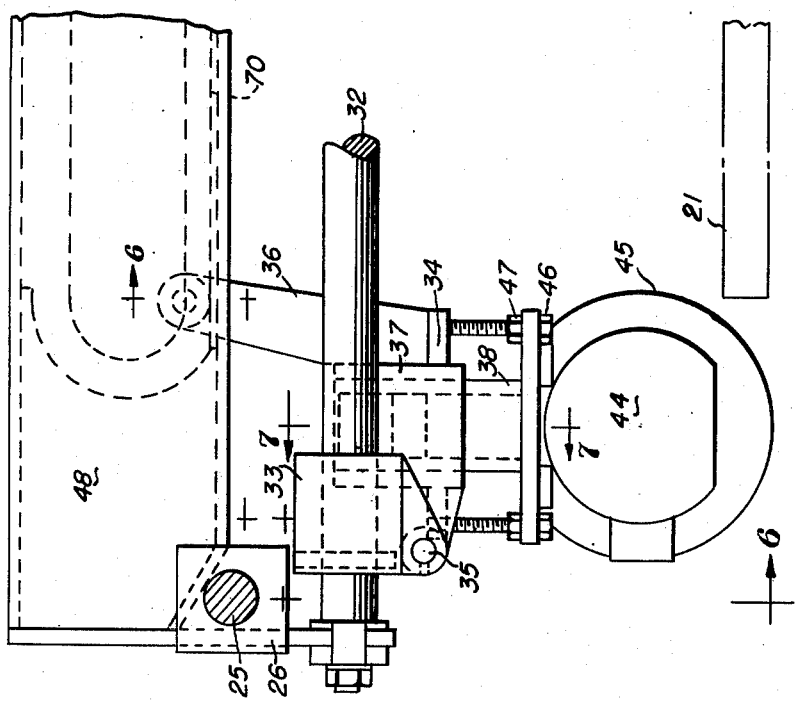
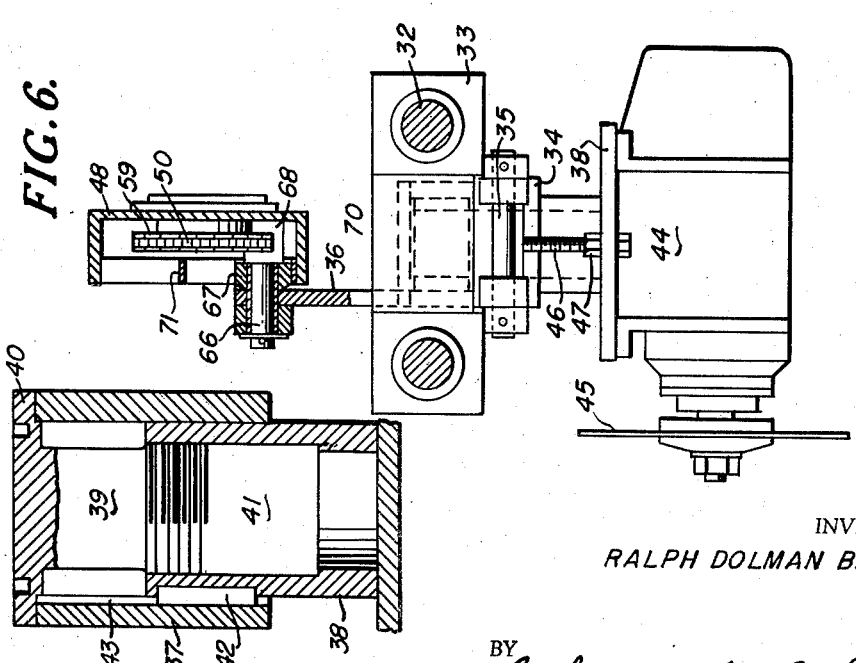

Nov. 12, 1957  R. D. BIBBY  2,812,787
FLYING SAW CUTTING APPARATUS FOR WORK
MOVING AT VARIABLE SPEED
Filed March 2, 1955  6 Sheets-Sheet 4

INVENTOR
RALPH DOLMAN BIBBY
BY
Cushman, Darby & Cushman
ATTORNEYS

Nov. 12, 1957 R. D. BIBBY 2,812,787
FLYING SAW CUTTING APPARATUS FOR WORK
MOVING AT VARIABLE SPEED
Filed March 2, 1955

INVENTOR
RALPH DOLMAN BIBBY

BY
ATTORNEYS

Nov. 12, 1957 R. D. BIBBY 2,812,787
FLYING SAW CUTTING APPARATUS FOR WORK
MOVING AT VARIABLE SPEED
Filed March 2, 1955 6 Sheets-Sheet 6

INVENTOR
RALPH DOLMAN BIBBY

BY *Cushman, Darby & Cushman*
ATTORNEYS

United States Patent Office

2,812,787
Patented Nov. 12, 1957

2,812,787

FLYING SAW CUTTING APPARATUS FOR WORK MOVING AT VARIABLE SPEED

Ralph Dolman Bibby, Lynchburg, Va., assignor to The Lane Company, Inc., Altavista, Va., a corporation of Virginia Application March 2, 1955, Serial No. 491,659

16 Claims. (Cl. 143—47)

This invention relates to cutting apparatus, and in particular to cutoff saws adapted to cut into sections of uniform, predetermined length a moving body of greatly extended or substantially infinite length. Bodies of various materials, such as plastics, metals and the like, are commonly formed in continuous manner by rolling, extrusion or equivalent methods, and it is necessary to periodically cut the continuously formed body into sections.

The formed material body, as will be readily understood, may move at constant velocity or in step-by-step fashion. In the former case, it is commonly necessary to stop the process of material formation to sever a formed section. In the case of extended bodies extruded or otherwise formed in step-by-step fashion, it is sometimes possible to sever sections therefrom while the body is momentarily at rest, that is in the brief interval between steps of forward movement. When the cross-sectional area of the body is large however, and the step movement rapid, it is often impossible to cut through it in the space of a momentary rest period, and in such case also it is necessary to interrupt the process of material formation in order to sever formed sections.

An illustrative example of the problem is in the step-by-step extrusion of comminuted wood and binder material in board or similar form, such as is effected by the extrusion apparatus described and claimed in my copending application Serial No. 460,570, filed October 6, 1954, now Patent 2,730,760, issued January 17, 1956, and the present invention is particularly useful in connection with such machines. The extrusion apparatus of my previously filed application is adapted to extrude board shapes ranging with width up to four feet and in thickness up to two inches, with a stroke interval of one second or less. The board product is relatively dense and hard, and it is obviously impossible to sever sections therefrom in the momentary rest periods between strokes. Since the extrusion machine is designed to work continuously for eight hour and longer periods, the necessity to stop the machine periodically to sever product sections is distinctly disadvantageous.

It is a principal object of the present invention, accordingly, to provide means adapted to automatically cut a moving body into sections of uniform and predetermined length, without interrupting the movement thereof.

A further object of the invention is to provide a transversely traversing power saw adapted to travel with a moving body during its operative stroke across the body.

Another object of the invention is to provide in apparatus adapted to cut a moving body into sections a traversing saw actuated by the body and powered only immediately prior to and during operative strokes thereof.

Still another object is to provide in cutting apparatus a traversing saw adapted to move in an operative stroke across the path of a body, and in a return stroke above the path of the body.

Yet another object is to provide a cutoff saw for moving bodies readily adjustable to saw off sections of varying length, and adapted to stack the sections as they are severed. Further objects will be in part obvious and in part pointed out hereinafter.

The invention and the novel features thereof may best be made clear from the following description and the accompanying drawings, in which:

Figure 4 is a sectional view taken on the line 4—4 of Figure 1;

Figure 6 (Sheet 3) is a sectional view taken along the line 6—6 of Figure 4;

Figure 7 is a sectional view taken on the line 7—7 of Figure 4;

Figure 1:
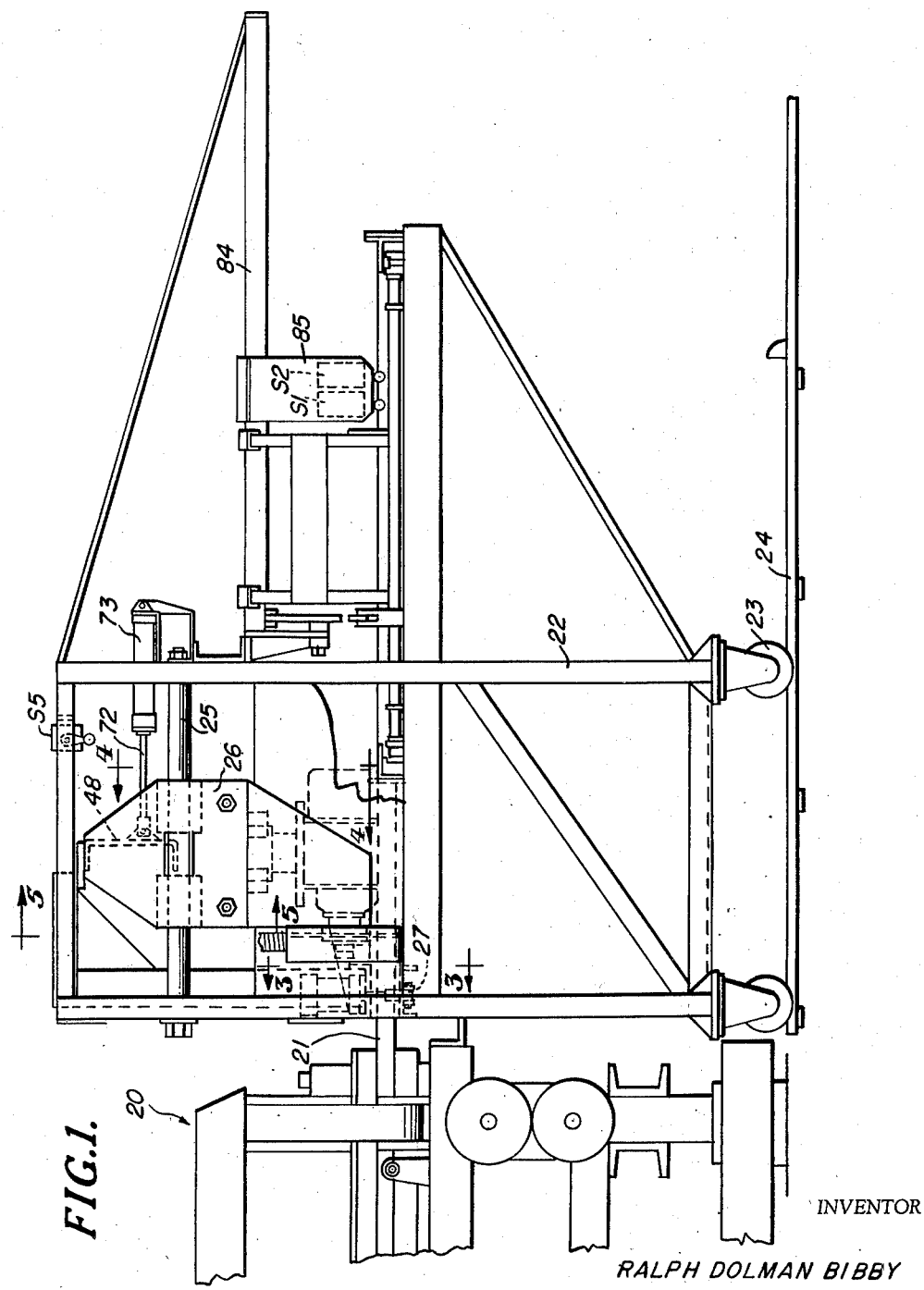
Figure 1 is a side elevational view of a preferred embodiment of the invention, arranged in operative relationship with an extrusion apparatus of the type defined in my above mentioned Patent No. 2,730,760.

Referring to the drawings in detail, Figure 1 illustrates the outfeed end of an extrusion machine 20, of the type disclosed in my copending application previously identified and adapted to extrude in step-by-step fashion a board or body 21. The cutting apparatus of the present invention comprises a frame 22, aligned with and disposed about or adjacent the path of the moving body 21. As shown, the body is extruded through the frame 22 from left to right. If desired, the frame 22 may be mounted on wheels 23 so as to be readily movable longitudinally on tracks 24, whereby the cutting apparatus may be easily backed away from the extrusion machine when access to the outfeed end of the latter is required.

Figure 3:
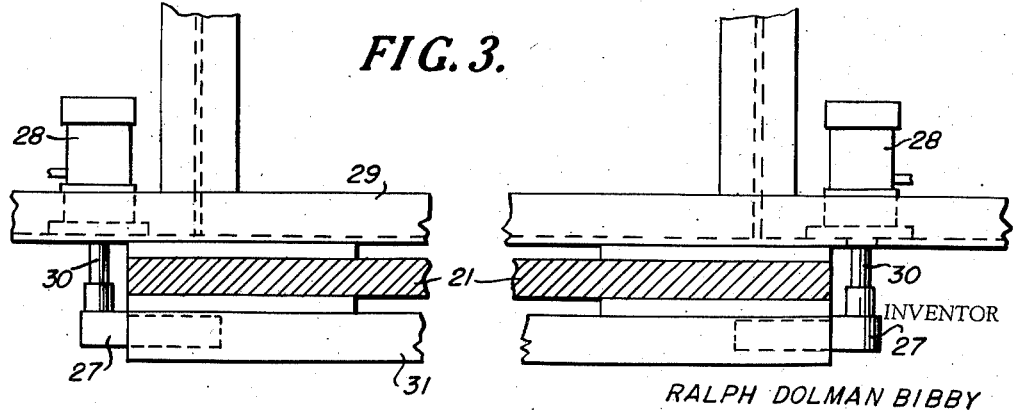
Figure 3 is a sectional view taken on the line 3—3 of Figure 1.

Frame 22 mounts a plurality of longitudinally disposed guide rods 25, on which a transversely extending carriage 26 is slidably supported. At its lower forward corners (see Figure 3) the carriage is provided with a pair of oppositely disposed clamps 27, actuated by pneumatic cylinders 28. In the manner shown, each cylinder 28 is mounted vertically on a transverse backing member 29, with its rod 30 extending downwardly therethrough to the engaged clamp, and the clamps may be joined by a transverse clamp bar 31. The clamp bar 31, it will be noted, is disposed below the path of the moving body 21 and the backing member is disposed thereabove, whereby the moving body may readily be clamped and firmly engaged therebetween.

Referring to Figures 4 to 7, the carriage 26 supports one or more transverse guide rods 32, on which a crosshead 33 is slidably mounted. One end of a saw mount 34 is pivotally engaged to the crosshead by means of a longitudinally disposed pivot pin 35, and from the other end of the saw mount an arm 36 extends upwardly.

The saw mount 34 includes a cylindrical section 37, into which a motor base 38 extends upwardly (Figure 7). An adjusting plug 39 extends downwardly into the mount section 37, its upper flange 40 resting on the upper end of section 37 and its lower end 41 being threadably engaged to the motor base, as shown. A key 42 may extend from the motor base 38 into the keyway 43 of the mount section 37, to prevent the motor base from turning. To the underside of the motor base 38 is fixed an electric motor 44, its shaft carrying a circular saw blade 45. The motor base may be stabilized by the bolts 46 extending upwardly therethrough into threaded engagement with the mount 34, and lock nuts 47 may be provided to fix the motor base and bolts 46 in desired adjusted position.

Figure 2:
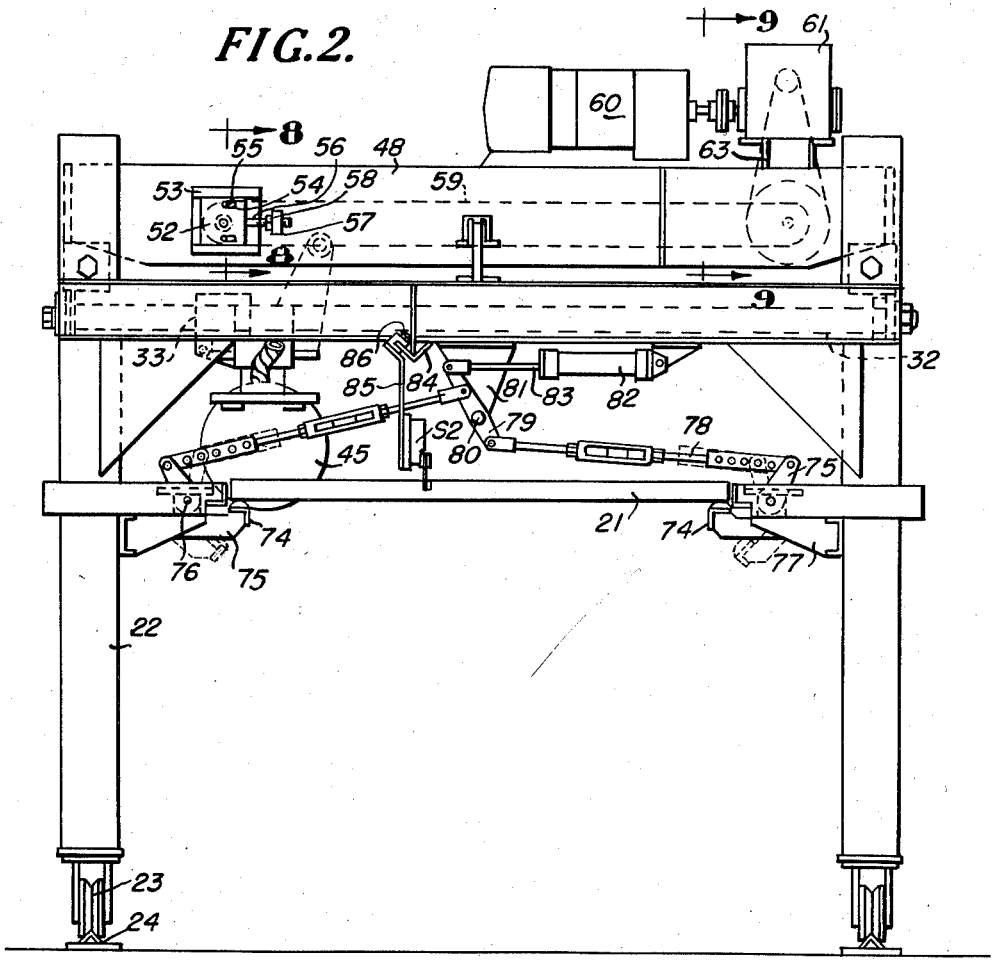
Figure 2 is an end elevational view of the device of Figure 1, looking toward the right hand end thereof.
Figure 8:
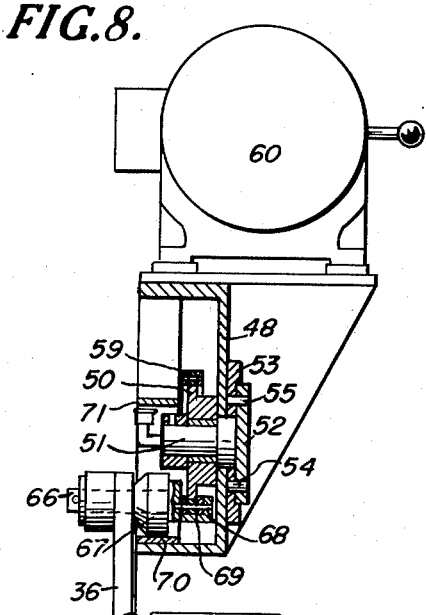
Figure 8 (Sheet 4) is a sectional view taken on the line 8—8 of Figure 2.

In the carriage 26 above the crosshead guide rods 32 is mounted a transverse channel 48, in which is disposed a chain conveyor. The conveyor includes a fixedly mounted sprocket 49 and a sprocket 50 mounted on a stud 51. The stud 51 is fixedly secured to an adjustment plate 52, which in turn is slidably mounted between guides 53 carried by the channel 48. As shown in Figures 2 and 8, plate 52 is provided with slots 54, which enclose pins 55 extending from the guides 53, and with a threaded rod 56 which extends through a lug 57 fastened to the channel side. An adjusting nut 58 on the rod 56 provides simple means for adjusting the relative position of plate 52 and stud 51, whereby the tension of the chain 59 connecting the sprockets 49 and 50 may be readily adjusted.

Figure 9:
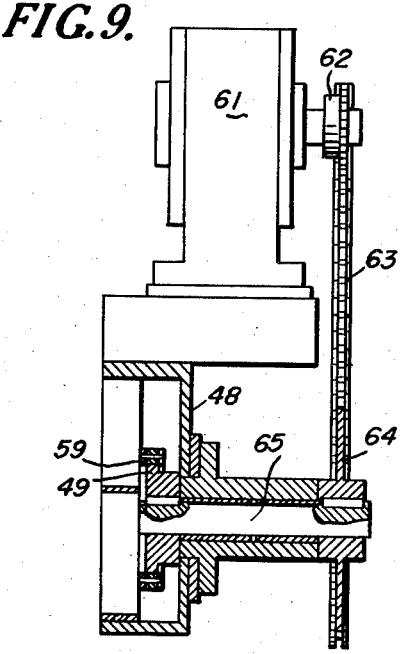
Figure 9 is a sectional view taken on the line 9—9 of Figure 2.

The chain conveyor is driven by an electric motor 60 mounted on the channel 48, through reduction gear box 61, pinion 62, chain 63 and the drive sprocket 64, which is engaged to a stub shaft 65 (Figure 9) also carrying the sprocket 49.

The upper end of the saw mount arm 36 is apertured, and engaged by a pin 66 extending therethrough to the conveyor chain 59. As best illustrated in Fig. 8, the pin 66 carries a supporting roller 67, and beyond the roller is formed into a U-shaped housing 68, in which an elongated chain pin 69 is mounted. In this manner, the saw mount 34, the power saw carried thereby and the crosshead 33 are connected to the chain 59, and constrained to move with it across the path of the moving body and back, in a manner presently to be described, the crosshead of course being restricted to straight line movement by its guide rods 32. A track 70 is provided on the lower flange of channel 48 to support the roller 67 as it follows the lower flight of the chain conveyor, and a similar track 71 extends laterally from the channel 48 to support the roller as it travels with the upper flight of the conveyor. As illustrated in Figure 1, the carriage channel 48 is engaged to the outer end of the rod 72 extending from a pneumatic return cylinder 73, longitudinally mounted on the machine frame.

Generally to the rear of the saw carriage a pair of longitudinally extending support rails 74 are disposed immediately below the path of the moving body 21 (see Figure 2). Each rail is carried by an angulated link 75 centrally pivoted at 76 on a frame element 77, whereby the rails may be swung downwardly and outwardly to drop successive sections severed from the body 21. The other ends of the brackets 75 are engaged through adjustable links 78 to an arm 79, which is centrally pivoted at 80 on the frame bracket 81, and a pneumatic release cylinder 82 is engaged by its rod 83 to an outwardly extending end of arm 79, the cylinder 82 being pivotally engaged at its opposite end to the frame.

An angle bar 84, Figures 1 and 2, extends longitudinally and rearwardly from the frame above the path of the moving body, supporting a plate 85 which is adjustably secured thereto, as by means of a set screw 86. The plate 85 mounts a pair of limit switches S1 and S2, disposed with their actuating arms directly in the path of the moving body. Adjacent one end thereof, the channel 48 mounts a limit switch S3 (see Figure 5), adapted to be engaged by the support roller 67 associated with the upper end of saw mount arm 36 at one end of its stroke. Another limit switch S4 is mounted on channel 48 adjacent the other end of the chain conveyor, and the crosshead 33 carries a pad 87 adapted to actuate this switch near an end of the crosshead stroke. A limit switch S5 may be adjustably mounted on an upper element of the frame as illustrated in Figure 1, adapted to be engaged and actuated by the channel 48 should the channel reach such point in its rearward travel.

Figure 5:
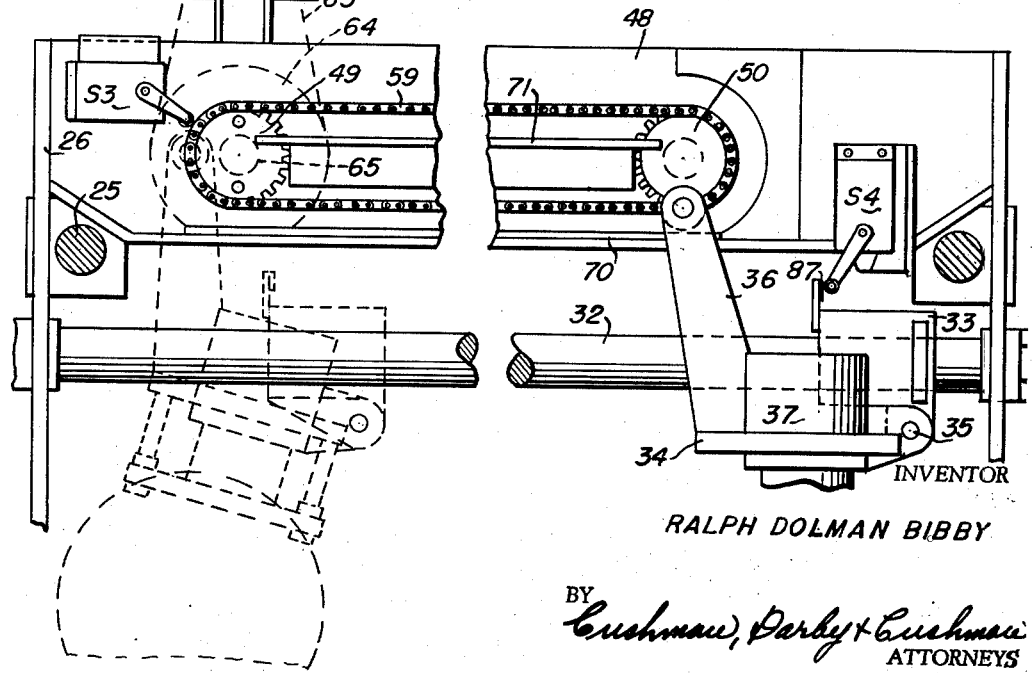
Figure 5 is a sectional view taken on the line 5—5 of Figure 1.

Function and operation of the apparatus will now be described in detail. The normal rest position of the crosshead 33 and saw motor 44 between cycles of operation is approximately as illustrated in Figures 4 and 5. In such position, it will be noted, the saw blade 45 is disposed laterally of the path of the body 21, the support roller 67 rests upon the lower channel track 70, and the motor base 38 is substantially horizontal.

Figure 10:
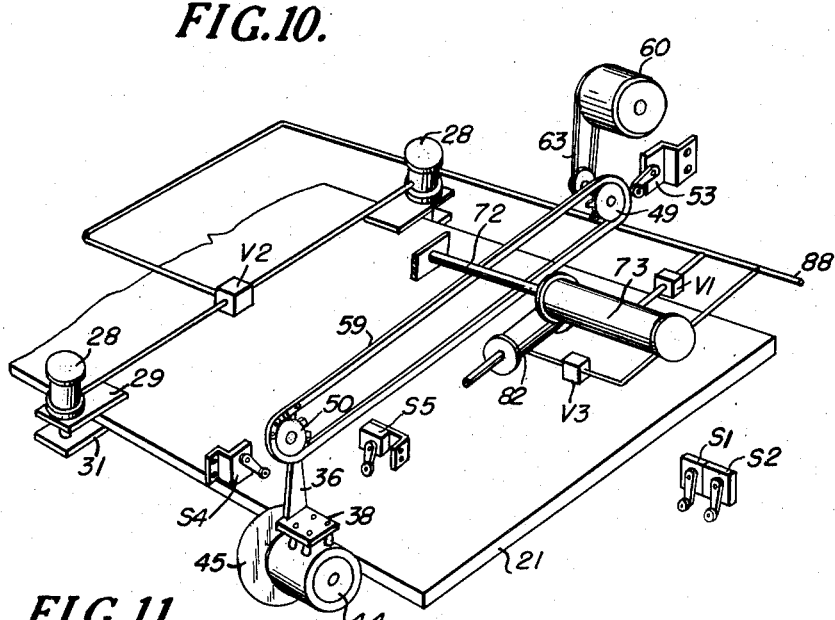
Figure 10 is a simplified perspective diagram illustrating the positional relationship of the principal elements of the embodiment illustrated in the preceding figures, and the pneumatic system thereof.
Figure 11:
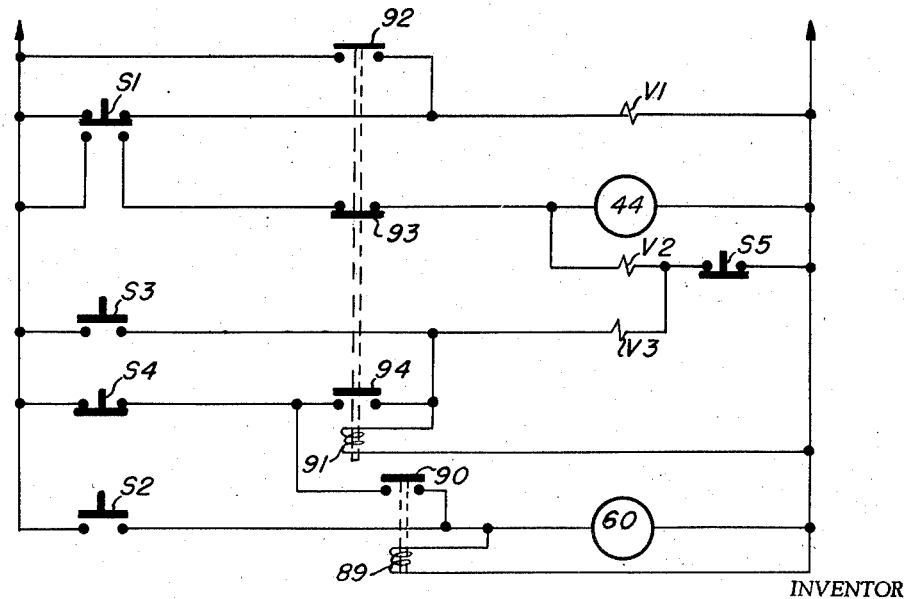
Figure 11 is a simplified illustrative electrical diagram of the machine.

Figure 11 illustrates the state of the electrical system when the machine is in normal rest condition. Referring to that figure, it will be seen that switch S1 is a double throw switch, normally closing a circuit through an electrically operated valve V1 (see Figure 10). Valve V1 is open when energized, permitting access of pressure air from manifold 88 to the pneumatic cylinder 73, the pressure air being effective to extend and maintain the cylinder rod 72 in extended position, and thereby return the carriage 26 to the initial starting position illustrated in Figure 1, at the left hand limit of its travel, and maintain it there.

Limit switches S2 and S3, as illustrated, are normally open, and limit switch S4 is normally closed. An electrically operated valve V2, open when energized, is adapted to provide access of pressure air to the clamp cylinders 28, and a similar valve V3, also open when energized, is adapted to provide access of pressure air to the release cylinder 82.

As the body 21 is extruded in increments from the machine 20, its outer end will pass successively under the carriage 26 and then outwardly over and onto the support rails 74. The support rails maintain the extruded body horizontal, and prevent it from bending downwardly under its own weight. The operating cycle of the mechanism is initiated when the outer end of the moving body encounters and actuates switch S1. Actuation of switch S1, as indicated in Figure 11, opens the circuit through valve V1, thereby closing the valve and the supply of pressure air to cylinder 73, and venting that cylinder to the atmosphere. In this manner the carriage 26 is freed to travel rearwardly on its guide rods 25, in the direction of movement of the body 21.

Actuation of the double throw switch S1 also closes a power circuit through the motor 44, causing that motor to start turning the saw blade 45, and an auxiliary circuit through valve V2 and switch S5. The so energized valve V2 is thereby opened, admitting pressure air to the clamp cylinders 28, causing these cylinders to retract their piston rods and firmly engage the body 21 between clamp bar 31 and the backing member 29. Accordingly actuation of switch S1 is effective to engage the carriage to the moving body, whereby the carriage is constrained to move with the body during a succeeding portion of the cycle.

A brief interval after the actuation of switch S1, the outer end of the moving body will engage and actuate switch S2, closing that switch and thereby actuating the traverse motor 60. The brief time interval is designed to permit the previously energized motor 44 to bring the saw 45 up to cutting speed. Closing switch S2 also completes an auxiliary circuit through the solenoid 89 of an electromagnetic switch 90, which thereupon closes to complete a holding power circuit for motor 60 through switch S4.

When the motor 60 is started, it drives the chain 59 through gear box 61, chain 63, sprocket 64 and sprocket 49. Movement of the chain 59, it will be understood, is effective through the connected pin 66 and saw mount arm 36 to draw the cross-head 33, saw mount 34 and the power saw transversely across the carriage, the pin roller 67 riding the lower channel track 70 to maintain the assembly level. In its traverse of the carriage, the rotating saw blade 45 is carried directly across the path of the body 21, and severs a section therefrom. The position of the crosshead and saw assembly shortly after starting its operative stroke is illustrated in Figure 2, wherein the saw blade has entered well into the body 21. Since the carriage and all elements mounted thereon are engaged to and moving with the body, the saw makes a precise right angle cut.

The saw and its supporting structure continue across the path of the moving body until the dotted line position of Figure 5 is attained, at which time the chain 59 carries the connected pin 66 up and around the sprocket 49. This action elevates the saw mount arm 36, causing the saw mount and saw to pivot upwardly about the crosshead pivot 35 to assume an angular position. By this means the saw blade, which has completed its operative stroke and severed a section from the moving body, is elevated to a position above the path of the body. The severed body section is now supported exclusively by the rails 74, and the next sequential step in the operation is initiated by the roller 67, which engages and actuates the limit switch S3 as it passes upwardly about sprocket 49.

Referring again to Figure 11, it will be seen that the momentary closing of switch S3 completes a circuit through valve V3 and closes switch S5, admitting pressure air through the thereby opened valve V3 to cylinder 82 and causing retraction of its piston rod 83. As seen in Figure 2, retraction of rod 83 is effective to pivotally rock the arm 79 in clockwise direction as shown, moving the links 78 inwardly to swing brackets 75 about their pivots 76, and swing the support rails 74 downwardly and outwardly to the dotted line position illustrated, to release the severed body section and permit it to drop down, preferably onto a stack positioned therebelow.

The momentary closing of switch S3 also completes an auxiliary circuit through the solenoid 91 of an electromagnetic gang switch comprising switches 92, 93 and 94. The normal (de-energized) position of these switches is illustrated in Figure 11, and actuation of the gang switch closes switches 92 and 94, and opens switch 93. Closing of switch 92 completes a circuit through valve V1, to open valve V1 and admit pressure air to return cylinder 73. The piston rod 72 of cylinder 73 is thereby caused to extend and to return the carriage and all elements mounted thereon to the initial starting position of Figure 1. Simultaneously, the opening of switch 93 breaks the circuit through the saw motor 44, permitting the motor which has completed its cut to come to rest, and also breaks the auxiliary circuit through valve V2.

De-energization of valve V2 closes that valve and vents the clamp cylinders 28 to the atmosphere, permitting the cylinder rods 30 to extend and drop the clamp bar 31, whereby the carriage is disengaged from the moving body. The carriage is disengaged from the moving body, accordingly, precisely at the moment that the return cylinder 73 begins the return travel of the carriage, which is in direction opposite to that of the body.

Simultaneous closing of the ganged switch 94 completes a holding circuit through solenoid 91, maintaining the gang switch in actuated condition through switch S4, after the momentary closing of switch S3. In this manner energization of valves V1 and V3 is maintained for an interval after the momentary closing of switch S3. The condition of switch S3 does not affect the operation of the traverse motor 60, which is locked in through switch S4 and continues to run. Dropping of the severed body section permits switches S1 and S2 to return to initial starting condition, but since motor 44 has already been de-energized by the opening of switch 93 and motor 60 remains energized through switch S4, return of the switches S1 and S2 at this time has no effect.

The continuing operation of motor 60 draws the roller 67 beyond the switch S3 and on to the upper channel track 71, whereupon the crosshead 33 and saw assembly are moved in a return stroke back across the path of the moving body. In this return stroke, the saw mount 34 is maintained in upwardly angulated position, the saw blade 45 being held thereby at a level higher than that of the moving body. In this manner the saw blade traverses back over the moving body, which in the meantime has advanced thereunder. In the return traverse of the carriage, the upper channel track 71 supports the roller 67, to prevent the chain 59 from sagging downwardly to permit the saw blade to contact the body.

Near the end of the return stroke, as the pin 66 travels downwardly about the sprocket 50, the crosshead pad 87 momentarily engages and actuates switch S4. Opening of switch S4 permits the switch 90 to open, thereby breaking the holding circuit through the traverse motor 60. The traverse motor comes to rest with the elements driven thereby substantially in the initial starting position illustrated in Figure 5, the crosshead pad 87 having cleared switch S4 to permit it to return to its normal closed position.

Momentary opening of switch S4 also breaks the holding circuit through valve V3, closing that valve and venting cylinder 82 to the atmosphere. The consequent extension of piston rod 83 returns the support rails 74 to supporting position illustrated in Figure 2, ready to receive the advancing new end of the body. The opening of switch S4 also breaks the holding circuit through solenoid 91 and permits the gang switch 92, 93, 94 to return to the normal position illustrated in Figure 11. The closing of switch 93 makes the power circuit for saw motor 44 ready to be again completed by actuation of switch S1. Opening of switch 92 does not affect valve V1, which now remains energized through the switch S1 in normal position. This marks the completion of a cycle, the apparatus being again in the condition initially described, ready for successive operations. The new end of the moving body may proceed along the support rails 74 until it in turn engages the limit switches S1 and S2, whereupon another section will be automatically severed in the manner described.

The plate 85 may be adjusted along the length of bar 84, to determine the length of the sections to be severed. As will be evident, once the plate 85 is suitably positioned, the apparatus will automatically sever sections of uniform length. These sections are released invariably by the rails 74 in the same position, whereby they may be neatly piled between the tracks 24. Ordinarily, a dolly, pallet or other movable platform will be disposed between tracks 24 to receive a pile of severed sections, and facilitate transportation away from the machine. Obviously, the position of the rails 74 may be suitably adjusted, to accommodate changes in width and thickness of the body.

The limit switch S5 may be provided as a safety device. The permissive travel in longitudinal direction of the carriage 26 is ordinarily limited, and designed to provide ample time for the traverse of the saw across the body in its operative stroke. In the event of any malfunction resulting in incomplete severance of a section from the moving body in the time interval required for the carriage to travel with the body a predetermined distance, as set by the adjusted position of switch S5, the carriage, or specifically channel 48 thereof, will engage and open the normally closed switch S5. Opening of the safety switch S5 is effective immediately to deactivate valves V2 and V3, whereby the cylinders 28 act to disengage the carriage from the moving body and cylinder 82 actuates the support rails 74 to remove support from the extending body section. Return cylinder 73 is not actuated, and motor 44 continues to drive the saw blade 45 until switch S3 is closed. Also, operation of the traverse motor 60 continues without interruption.

If desired, the safety switch S5 may also be tied in with the power circuit of the machine 20 forming the moving body, so that such machine will stop in the event of malfunction, and the body 21 will come to a halt. Once the cause of the malfunction is determined and corrected, normal operation may be resumed, and the switch S5 will be inactive.

Figure 12:
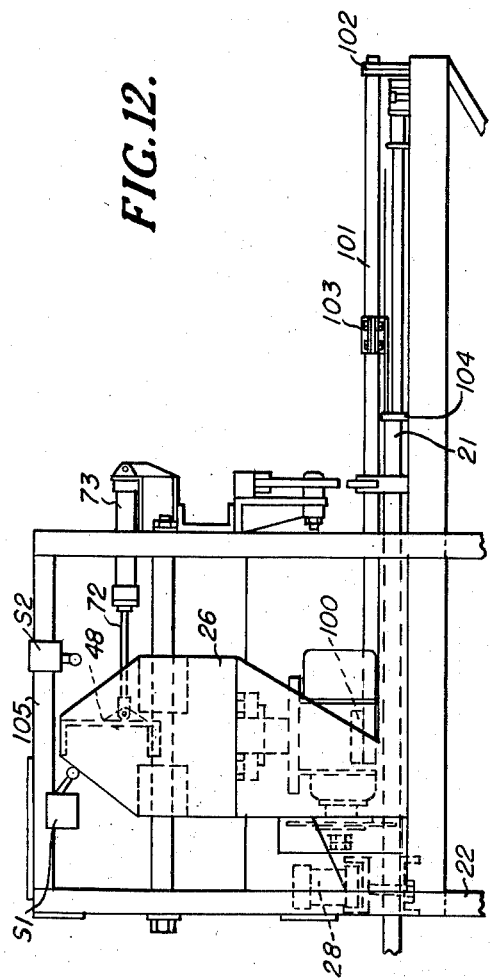
Figure 12 is a fragmentary side elevational view of a modified form of the invention.
Figure 13:
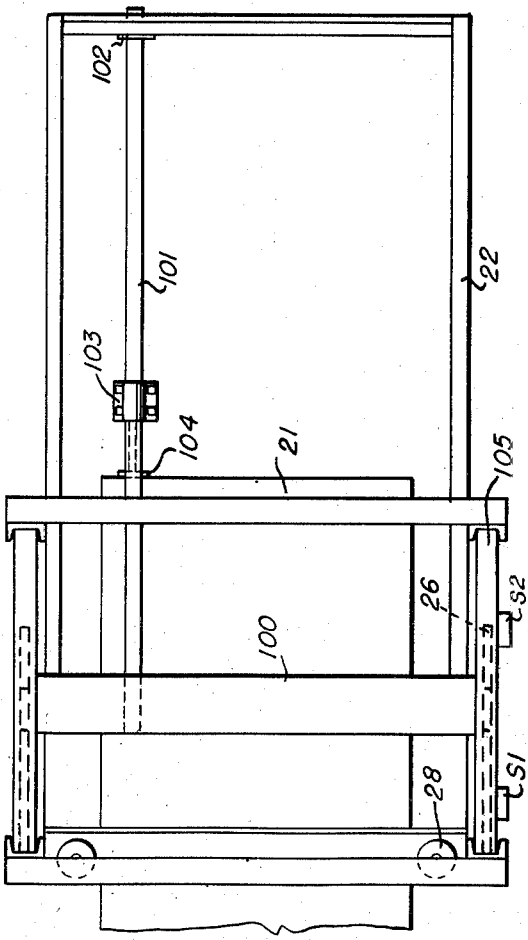
Figure 13 is a plan view of the embodiment of Figure 12, with parts omitted for the sake of clarity.

In the case of material bodies extruded in step-by-step fashion, when the extruded increments are sizable the embodiment previously described may cut therefrom sections varying slightly in length. This follows from the circumstance that the switch S1 may be actuated (and the carriage engaged to the body) at different stages of a forward stroke or impulse of the body, resulting in corresponding disparity in distance between the saw cut and the leading edge of the body. To insure uniformity in severed section length in such cases, the apparatus may be modified as illustrated in Figures 12 and 13.

As there shown, carriage 26 is provided with a transverse brace 100 adjacent its lower end, and to this brace is fixedly secured a forwardly extending draw bar 101. The draw bar is slidably supported adjacent its outer end by a bushing 102 mounted on the forward end of the frame. A slide 103 adjustably fixed to the draw bar 101 carries therebelow a bracket 104, which is disposed directly in the path of the moving body.

The angle bar 84 and supporting plate 85 may be eliminated, and the switches S1 and S2 mounted on the upper longitudinal element 105 of the frame 22. Switch S1, as shown, may be mounted for actuation by movement of the carriage away therefrom, and switch S2 arranged for actuation by the carriage when it has moved a short distance relative to the frame. Either or both switches may be adjusted along the supporting element 105 for optimum operation. In other respects the modified machine may correspond to and function in the manner of the embodiment first described.

In the modified arrangement, the body 21 is extruded under the carriage 26 and outwardly onto the support rails 74 until it encounters bracket 104. Further movement of the body will displace bracket 104, and through slide 103 the draw bar 101 and carriage 26 engaged thereto. Movement of the carriage with the body 21 initially actuates switch S1, whereupon the operating cycle of the mechanism will be initiated and proceed precisely as previously described. That is, actuation of switch S1 energizes motor 44 and clamps the carriage to the moving body by means of cylinders 28, the clamp cylinders thereafter cooperating with the draw bar to move the carriage along with the body. In this manner it is insured that the carriage and the saw are engaged to the moving body in predetermined and invariable relationship to the leading edge thereof, whereby successive sections cut therefrom are of uniform length. Shortly after the cycle is initiated the moving carriage will encounter and actuate switch S2, actuating the traverse motor 60, and the cycle proceeds without change.

In its movement with the carriage, draw bar 101 slides freely through its supporting bushing 102. When a severed section is released and permitted to drop down, it falls out of contact with bracket 104, and the return travel of the carriage effected by cylinder 73 returns the draw bar and its bracket to initial starting position. In this embodiment adjustment in length of the severed sections is readily accomplished by adjustably setting the position of slide 103 on the draw bar 101.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. Means for cutting a continuously moving body into sections comprising a frame disposed adjacent the path of said body, a carriage longitudinally movable on said frame, cutting means movably mounted on said carriage, means to move said cutting means transversely of said carriage in an operative stroke across the path of said body, and means drivingly connecting said carriage to said moving body during the operative stroke of said cutting means whereby said carriage is moved parallel to the direction of movement of said body solely by said body through said drivingly connecting means.

2. Means for cutting into sections a body moving continuously but at a varying speed comprising a frame disposed adjacent the path of said body, a carriage longitudinally movable on said frame, cutting means movably mounted on said carriage, means to move said cutting means transversely of said carriage in an operative stroke across the path of said body and in a return stroke above the path of said body, and means drivingly connecting said carriage to said moving body during the operative stroke of said saw means whereby said carriage is moved parallel to the direction of movement of said body solely by said body through said drivingly connecting means.

3. Means for cutting into sections a body moving continuously but at a varying speed comprising a frame disposed adjacent the path of said body, a carriage longitudinally movable on said frame, a power saw movably mounted on said carriage, means to move said saw transversely of said carriage in an operative stroke across the path of said body and in a return stroke above a path of said body, and means drivingly connecting said carriage to said moving body during the operative stroke of said saw whereby said carriage is moved parallel to the direction of movement of said body solely by said body through said drivingly connecting means.

4. Apparatus as defined in claim 3, including means to move said carriage in direction opposite to that of said body subsequent to the operative stroke of said saw, to return said carriage to starting position.

5. Apparatus according to claim 3, including means to move said carriage in direction opposite to that of said body during the return stroke of said saw, to return said carriage to starting position.

6. Apparatus as defined in claim 3, including means to activate said saw, said body engaging means and said saw moving means when the end of said body reaches a predetermined point relative to said saw.

7. Apparatus as defined in claim 3, including means to activate said saw and said body engaging means when the end of said body reaches a predetermined point relative to said saw, and means to activate said saw moving means a brief interval of time thereafter.

8. Apparatus as defined in claim 7, including means to deactivate said saw and said body engaging means at the end of the operative stroke of said saw.

9. Apparatus as defined in claim 8, including means to deactivate said saw moving means at the end of the return stroke of said saw.

10. Means for cutting into sections a body moving continuously but at a varying speed comprising a frame disposed adjacent the path of said body, a carriage longitudinally movable on said frame, a power saw movably mounted on said carriage, means to move said saw transversely of said carriage in an operative stroke across the path of said body and in a return stroke above the path of said body, means drivingly connecting said carriage to said moving body during the operative stroke of said saw whereby said carriage is moved parallel to the direction of movement of said body solely by said body through said drivingly connecting means, and support means disposed longitudinally immediately below the path of said body beyond said carriage, said support means being movable downwardly and outwardly to release a severed section.

11. Apparatus as defined in claim 10, including means to move said support means to release position at the end of the operative stroke of said saw.

12. Apparatus as defined in claim 10, including means to deactivate said saw and said body engaging means, and to move said support means to release position at the end of the operative stroke of said saw.

13. Apparatus as defined in claim 10, including safety means adapted to stop the movement of said body if said carriage travels beyond a predetermined point.

14. Apparatus as defined in claim 10, including safety means adapted to stop the movement of said body if said carriage travels beyond a predetermined point, and to simultaneously deactivate said body engaging means and move said support means to release position.

15. Apparatus as defined in claim 10, including safety means adapted to deactivate said body engaging means and move said support means to release position if said carriage travels beyond a predetermined point.

16. Means for cutting into sections a body moving continuously but at a varying speed comprising a frame disposed adjacent the path of said body, a carriage longitudinally movable on said frame, a power saw movably mounted on said carriage, means to move said saw transversely of said carriage in an operative stroke across the path of said body and in a return stroke above the path of said body, means drivingly connecting said carriage to said moving body when the leading edge of said body reaches a predetermined point relative to said carriage whereby said carriage is moved parallel to the direction of movement of said body solely by said body through said drivingly connecting means, and means to activate said saw a brief interval of time thereafter.

References Cited in the file of this patent

UNITED STATES PATENTS

| | | |
|---|---|---|
| 771,836 | Schantz | Oct. 11, 1904 |
| 1,062,814 | Bernhardt | May 27, 1913 |
| 1,147,289 | Williams | July 20, 1915 |
| 1,413,191 | Roland | Apr. 18, 1922 |
| 1,567,289 | Munroe | Dec. 29, 1925 |
| 1,583,188 | Schumacher | May 4, 1926 |
| 2,287,833 | Ridgway | June 30, 1942 |
| 2,341,870 | Johnston | Feb. 15, 1944 |
| 2,370,932 | Bolling | Mar. 6, 1945 |
| 2,480,536 | Andrus | Aug. 30, 1949 |
| 2,610,688 | Overman | Sept. 16, 1952 |
| 2,730,760 | Bibby | Jan. 17, 1956 |